US008812712B2

(12) United States Patent
Balachandran et al.

(10) Patent No.: US 8,812,712 B2
(45) Date of Patent: Aug. 19, 2014

(54) PROXY-DRIVEN CONTENT RATE SELECTION FOR STREAMING MEDIA SERVERS

(75) Inventors: Krishna Balachandran, Morganville, NJ (US); Doru Calin, Manalapan, NJ (US); Eunyoung Kim, Basking Ridge, NJ (US); Kiran M. Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 177 days.

(21) Appl. No.: 12/222,897

(22) Filed: Aug. 19, 2008

(65) Prior Publication Data

US 2009/0089447 A1    Apr. 2, 2009

Related U.S. Application Data

(60) Provisional application No. 60/966,020, filed on Aug. 24, 2007, provisional application No. 60/966,017, filed on Aug. 24, 2007.

(51) Int. Cl.
*G06F 15/16*    (2006.01)

(52) U.S. Cl.
USPC ............ 709/231; 709/203; 709/217; 709/232

(58) Field of Classification Search
USPC ......... 709/203, 217–219, 227–229, 231–235, 709/241, 242, 249; 718/105; 370/232, 237, 370/238, 395.21, 328, 338, 231, 230.1, 235, 370/401
See application file for complete search history.

(56) References Cited

U.S. PATENT DOCUMENTS

| 6,101,193 | A | 8/2000 | Ohba | |
|---|---|---|---|---|
| 6,430,187 | B1 | 8/2002 | Park | |
| 6,690,647 | B1 | 2/2004 | Tang et al. | |
| 7,016,964 | B1 * | 3/2006 | Still et al. | 709/229 |
| 7,043,558 | B2 * | 5/2006 | Yoshida et al. | 709/231 |
| 7,068,607 | B2 * | 6/2006 | Partain et al. | 370/241 |
| 7,076,552 | B2 * | 7/2006 | Mandato | 709/226 |
| 7,161,907 | B2 * | 1/2007 | Mott | 370/232 |
| 7,225,267 | B2 * | 5/2007 | Key et al. | 709/235 |
| 7,251,216 | B2 * | 7/2007 | Dube et al. | 370/232 |

(Continued)

FOREIGN PATENT DOCUMENTS

| WO | WO 2008009029 A2 * | 1/2008 |
|---|---|---|
| WO | WO 2008102570 A1 * | 8/2008 |

OTHER PUBLICATIONS

International Report on Patentability dated Mar. 4, 2010.

(Continued)

*Primary Examiner* — Melvin H Pollack
(74) *Attorney, Agent, or Firm* — Harness, Dickey & Pierce, P.L.C.

(57) ABSTRACT

Methods for proxy-driven content rate selection for streaming media servers are provided. In one method, one or more maximum transmission rate parameters from a network controller are stored at a proxy server in response to a receiver report message from the client. A target rate for the media session is generated based on the stored maximum transmission rate parameters, and the target rate is transmitted to a media server in a proxy-to-server feedback message. The media server selects the content rate from among a plurality of supported content rates in response to the proxy-to-server feedback message from the proxy server, and streams streaming multimedia frames to the client at the selected content rate.

19 Claims, 6 Drawing Sheets

(56) References Cited

U.S. PATENT DOCUMENTS

| | | | |
|---|---|---|---|
| 7,251,218 B2* | 7/2007 | Jorgensen | 370/235 |
| 7,269,157 B2* | 9/2007 | Klinker et al. | 370/351 |
| 7,327,708 B2* | 2/2008 | Komandur et al. | 370/332 |
| 7,346,007 B2* | 3/2008 | Curcio et al. | 370/252 |
| 7,346,676 B1* | 3/2008 | Swildens et al. | 709/223 |
| 7,380,014 B2* | 5/2008 | LeCroy et al. | 709/231 |
| 7,443,797 B2* | 10/2008 | Cheung et al. | 370/236 |
| 7,477,602 B2* | 1/2009 | Ling et al. | 370/232 |
| 7,529,250 B2* | 5/2009 | Pedersen | 370/395.21 |
| 7,529,263 B1* | 5/2009 | Sparrell et al. | 370/437 |
| 7,617,337 B1* | 11/2009 | Beck et al. | 710/11 |
| 7,634,373 B2* | 12/2009 | Batterberry et al. | 702/79 |
| 7,653,002 B2* | 1/2010 | Hardy et al. | 370/252 |
| 7,653,735 B2* | 1/2010 | Mandato et al. | 709/231 |
| 7,688,729 B2* | 3/2010 | Ooghe et al. | 370/232 |
| 7,698,453 B2* | 4/2010 | Samuels et al. | 709/234 |
| 7,701,915 B2* | 4/2010 | Curcio et al. | 370/341 |
| 7,710,879 B2* | 5/2010 | Clark | 370/237 |
| 7,764,679 B2* | 7/2010 | MeLampy et al. | 370/389 |
| 7,779,146 B2* | 8/2010 | Deshpande | 709/233 |
| 7,788,354 B2* | 8/2010 | Nag | 709/223 |
| 7,873,346 B2* | 1/2011 | Petersson et al. | 455/406 |
| 7,883,419 B2* | 2/2011 | Cheung et al. | 463/42 |
| 7,903,674 B2* | 3/2011 | Collet et al. | 370/401 |
| 7,991,905 B1* | 8/2011 | Roussos et al. | 709/231 |
| 8,015,306 B2* | 9/2011 | Bowman | 709/231 |
| 2002/0089928 A1 | 7/2002 | Morikawa et al. | |
| 2002/0194609 A1 | 12/2002 | Tran | |
| 2004/0103141 A1 | 5/2004 | Miller et al. | |
| 2004/0186877 A1 | 9/2004 | Wang et al. | |
| 2004/0193762 A1 | 9/2004 | Leon et al. | |
| 2006/0253600 A1* | 11/2006 | Hannuksela | 709/231 |
| 2007/0091815 A1* | 4/2007 | Tinnakornsrisuphap et al. | 370/252 |
| 2007/0153801 A1* | 7/2007 | Sung et al. | 370/395.4 |
| 2007/0174474 A1* | 7/2007 | Zhong et al. | 709/230 |
| 2007/0198739 A1* | 8/2007 | Jennings et al. | 709/231 |
| 2008/0013545 A1* | 1/2008 | Ono et al. | 370/395.21 |
| 2008/0123660 A1* | 5/2008 | Sammour et al. | 370/395.21 |
| 2008/0192710 A1 | 8/2008 | Balachandran et al. | |
| 2008/0192711 A1 | 8/2008 | Balachandran et al. | |
| 2008/0195755 A1* | 8/2008 | Lu et al. | 709/241 |
| 2009/0013078 A1* | 1/2009 | Bencheikh | 709/227 |
| 2010/0029251 A1* | 2/2010 | McConnell et al. | 455/413 |
| 2012/0207151 A1* | 8/2012 | Alt et al. | 370/354 |

OTHER PUBLICATIONS

Written Opinion dated Mar. 16, 2009 for International Application No. PCT/US2008/009960.

International Search Report dated Mar. 16, 2009 for International Application No. PCT/US2008/009960.

Written Opinion dated Apr. 2, 2009 for International Application No. PCT/US2008/009968.

International Search Report dated Apr. 2, 2009 for International Application No. PCT/US2008/009968.

U.S. Office Action dated Aug. 17, 2011 for U.S. Appl. No. 13/064,288.

Office Action for corresponding U.S. Appl. No. 13/064,288 dated Oct. 19, 2012.

U.S. Office Action dated May 2, 2013 for related U.S. Appl. No. 13/064,288.

* cited by examiner

PROXY-DRIVEN CONTENT RATE SELECTION FOR STREAMING MEDIA SERVERS

PRIORITY STATEMENT

This non-provisional patent application claims priority under 35 U.S.C. §119(e) to provisional patent application No. 60/966,020 to Krishna Balachandran, Doru Calin, Eunyoung Kim and Kiran Rege, filed on Aug. 24, 2007, and provisional patent application No. 60/966,017 to Krishna Balachandran, Doru Calin, Eunyoung Kim and Kiran Rege, filed on Aug. 24, 2007. The entire contents of each these applications is incorporated herein by reference.

CROSS REFERENCE TO RELATED APPLICATIONS

This non-provisional patent application is related to U.S. patent application Ser. No. 11/674,802 to Krishna Balachandran, Doru Calin, Eunyoung Kim and Kiran Rege, filed on Feb. 14, 2007, and Ser. No. 11/674,858 to Krishna Balachandran, Doru Calin, Eunyoung Kim and Kiran Rege, filed on Feb. 14, 2007, the entire contents of each of these applications is also incorporated herein by reference.

BACKGROUND OF THE INVENTION

Description of the Related Art

Streaming media services (e.g., music, video, etc.) over wireless communication networks have been gaining in popularity over the past few years, and are likely to become commercially important to wireless service providers in the near future. A major impediment to their success is the often poor and/or unreliable quality associated with the services. In one example, this lack of reliability results from significant fluctuations in the rate at which packets carrying a media stream are delivered to mobile units. These fluctuations stem from variations in signal strength and the need to share the wireless access medium among multiple mobile units.

In another example, fluctuations in the rate at which packets are delivered to mobile units result from delay and/or loss of packets as they traverse a wireless link on the path between the media server and the mobile units. Conventionally, effects of lost packets, delayed packets, and/or jitter are reduced by buffering the received data stream at the mobile units. But, buffering alone is insufficient for ensuring acceptable media quality.

FIG. 1 conceptually illustrates a conventional system for streaming media to mobile units or clients over a wireless network.

Referring to FIG. 1, the portion of the wireless network 100 between the Gateway GPRS Support Node (GGSN) 120 and the media server 115 is referred to as the core network 105. The network segment between the GGSN 120 and the mobile client 110 (inclusive of GGSN 120 and mobile client 110) will be referred to as the wireless access network 125.

Conventionally, a mobile unit or client 110 (hereinafter referred to as a client) initiates a streaming multimedia (or media) session with a media server 115 via the wireless network 100. In one example, the client 110 requests a streaming video session by sending a real-time streaming protocol (RTSP) message to the media server 115. The mobile client 110 exchanges signaling messages with the media server 115 to establish the streaming video session and negotiate session parameters (e.g., the bit-rate at which the media is to be streamed).

In establishing a media session, the mobile client 110 also exchanges lower-layer signaling messages with the radio network controller (RNC) 130, the SGSN 103, and the GGSN 120 to establish a radio access bearer (RAB) channel. RAB channels are typically configured to maintain desired Quality-of-Service (QoS) characteristics, for example, if best-effort bearer service is deemed inadequate.

Once the RAB channel and the streaming media session are established, the media server 115 transmits packets carrying the media to the mobile client 110 via the GGSN 120, the SGSN 103, the RNC 130, and the base station 107. The mobile client 110 sends periodic feedback messages along the reverse path which traverses the base station 107 to the RNC 130, SGSN 103, GGSN 120, and, finally, the media server 115. Uplink feedback messages from the mobile client 110 are transmitted relatively infrequently, for example, once every 3-4 seconds.

The media server 115 also transmits control/signaling messages to the mobile client 110 on a periodic basis. These "server reports" are carried transparently by the network elements. Conventionally, downlink packets carrying the media and control/signaling messages and uplink feedback messages transmitted by the mobile client 110 are all carried transparently by the network elements. Thus, the feedback messages from the mobile client 110 that assist the media server 115 in making control decisions (such as changing transmission or content rate) are essentially end-to-end; that is, they do not carry any information available only to the intervening network elements.

Accordingly, in the conventional system shown in FIG. 1, control decisions by the media server 115 are based on rather infrequent feedback received from the mobile client 110, and without direct knowledge of the channel conditions. As a result, the media server 115 cannot make timely decisions to avoid packet loss and/or re-buffering events that are detrimental to the quality of the streaming media service.

SUMMARY OF THE INVENTION

Methods for proxy-driven content rate selection for streaming media servers are provided. In one method, one or more maximum transmission rate parameters from a network controller are stored at a proxy server in response to a receiver report message from the client. A target rate for the media session is generated based on the stored maximum transmission rate parameters, and the target rate is transmitted to a media server in a proxy-to-server feedback message.

At the media server, a content rate is selected from among a plurality of supported content rates in response to the proxy-to-server feedback message from the proxy server. The selected content rate is less than or equal to a target rate parameter derived from a target rate included in the proxy-to-server feedback message from the proxy server. The media server then streams multimedia frames to the client at the selected content rate.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
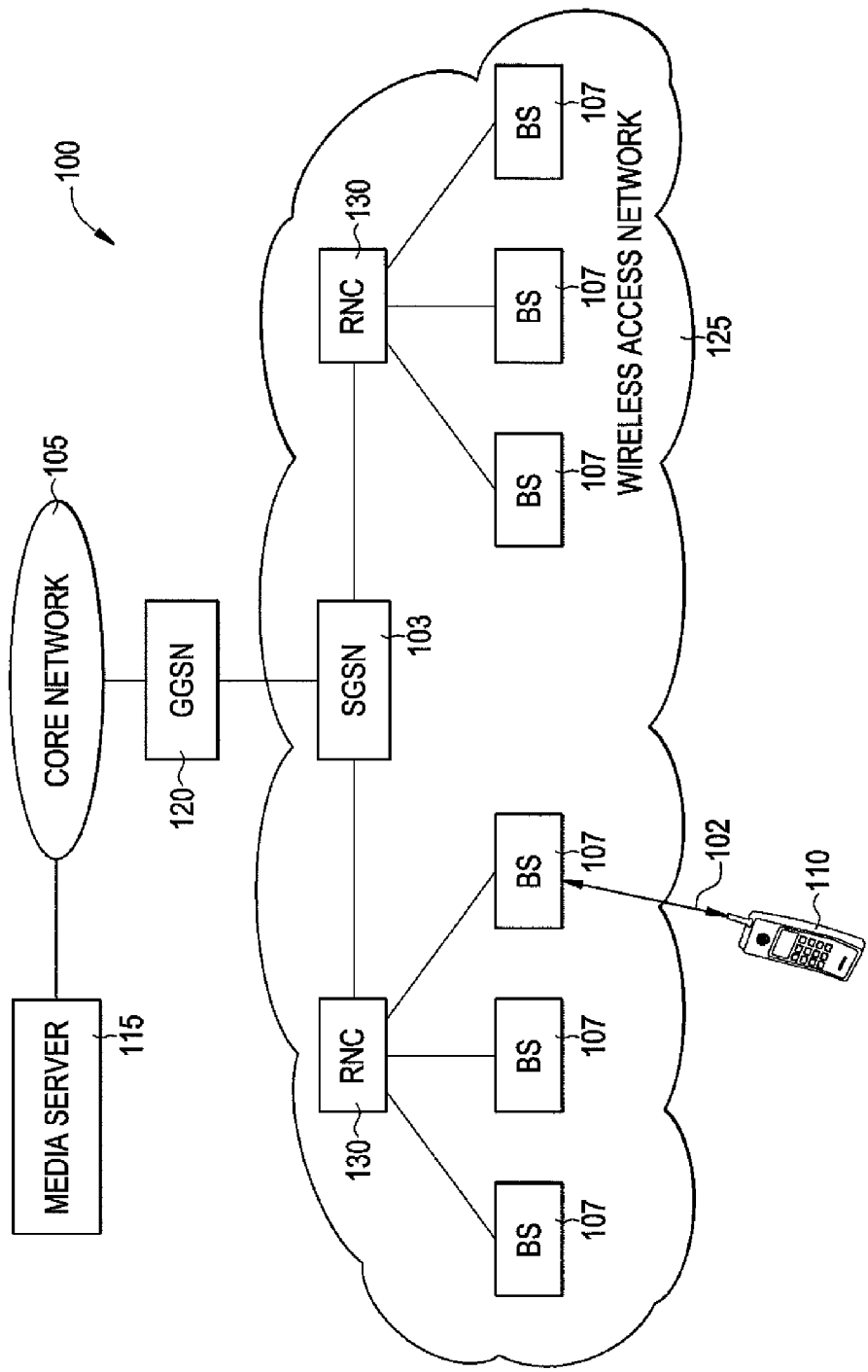
FIG. 1 illustrates a conventional system 100 for streaming media over a wireless network.

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples. Where applicable, the words and phrases used herein should be understood and interpreted to have a meaning consistent with the understanding of those words and phrases by those skilled in the relevant art.

As used herein, the term "mobile client" may be considered synonymous to, and may hereafter be occasionally referred to, as a client, mobile, mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

Figure 2:
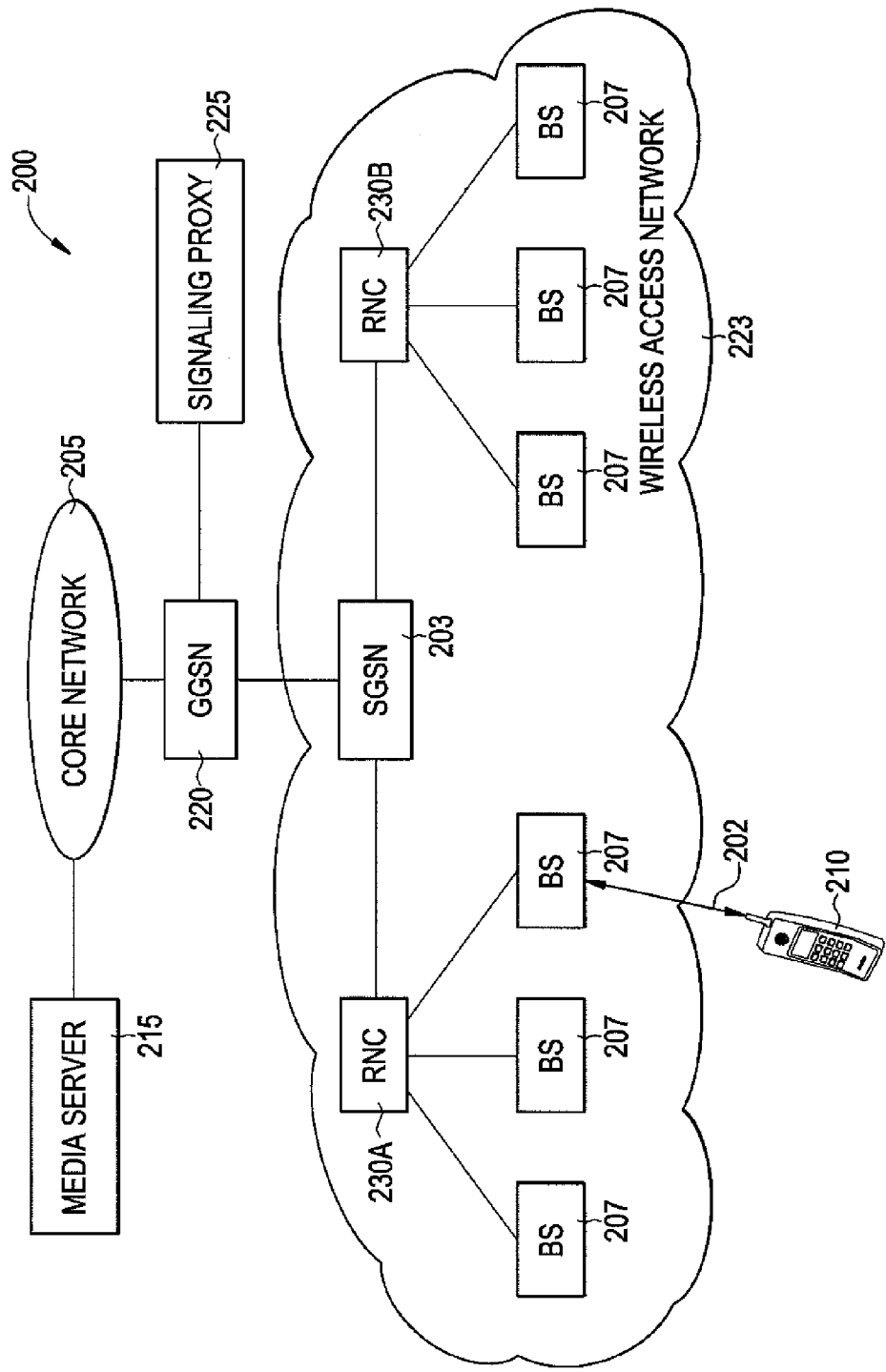
FIG. 2 illustrates a system 100 for streaming media over a wireless network according to an example embodiment.

FIG. 2 conceptually illustrates an example embodiment of a system for streaming media over a wireless network. The entire network between the media server 215 and mobile client 210 is referred to as a wireless network, even though it comprises wireless as well as wired segments. The network segment between GGSN 220 and mobile client 210 will be referred to as the wireless access network 223.

Referring to FIG. 2, the wireless access network 223 includes one or more base stations 207 to stream media over an air interface to one or more mobile clients or units 210 (referred to as "clients"). The media (e.g., audio, video, etc.) is provided by a media server 215 via a Gateway GPRS Support Node (GGSN) 220, a Serving GPRS Support Node (SGSN) 203, and a radio network controller (RNC) 230A. The wireless access network 223, the base stations 207, the client 210, the media server 215, the SGSN 203, the GGSN 220, and the RNCs 230A, 230B may operate according to the Universal Mobile Telecommunication System (UMTS) (3GPP) standards and/or protocols.

In streaming media sessions, the Real-time Transport Protocol (RTP) may be used to carry the media content (e.g., voice, video, audio, etc.) and the associated Real Time Control Protocol (RTCP) may be used to carry the associated control packets. RTCP messages will be discussed in somewhat more detail below. The Real Time Streaming Protocol (RTSP) may be used for the transmission of messages for session setup (including capability negotiation/exchange), teardown, and some user actions (e.g., pause, fast-forward, etc.).

Details regarding RTP/RTCP and RTSP are well-known as discussed in the Internet Engineering Task Force Requests for Comments (IETF RFCs) 1889 and 2326, respectively.

Although example embodiments are discussed with regard to particular standards and/or protocols, example embodiments may also be applied to any other wireless networking technology and standards, for example, cdma2000 High Rate Packet Data (HRPD) or IEEE 802.16e/WiMAX. In the case of cdma2000 HRPD, for instance, system 200 would appear identical to that in FIG. 2, except that the Serving GPRS Support Node (SGSN) 203 and the Gateway GPRS Support Node (GGSN) 220 would be replaced by a single entity known as the Packet Data Serving Node (PDSN).

Furthermore, although a hierarchical architecture is illustrated, the techniques described herein may also be applied to flat-Internet Protocol (flat-IP) based architectures where Layer 3 (IP) routing and control functions relating to the wireless access network 223 are performed by the base station 207.

According to example embodiments, the client 210 supports standard RTSP/RTCP signaling with or without 3GPP extensions for transparent end-to-end packet-switched streaming services.

During a media session the client 210 periodically sends RTCP (feedback) packets ("receiver report messages" or "receiver reports") towards the media server 215 to apprise the media server 215 of performance metrics such as: fraction of packets lost (since the last similar report), cumulative number of packets lost, highest (RTP) sequence number received, RTP timestamp associated with the last sender's report (received from the server), time since receiving the last sender's report, RTP sequence number associated with the next application data unit to be decoded, the delay until the decoding of the next application data unit, free buffer space (at the client), and the like. The last three of the preceding list of performance metrics are in accordance with the 3GPP extensions for packet-switched streaming services whereas the rest are more standard feedback items included in receiver report messages. Other than these items included in the receiver reports, each RTCP packet may also carry a timestamp that can be used by the server to relate the report to a specific point in time. The client 210 may send the RTCP feedback packets at a rate consistent with its own capability and the capacity of the wireless network. Typically, such feedback packets are sent rather infrequently—for example, once every 3 to 4 seconds. Hereinafter, the interval at which the client 210 sends RTCP feedback packets is denoted by $T_R$.

Still referring to FIG. 2, the wireless communication system 200 further includes a signaling proxy 225. The signaling proxy 225 may be implemented as a proxy server and is attached to a wireless access network entity, such as the Gateway GPRS Support Node (GGSN) 220. But, the signaling proxy 225 may be attached to other access network entities such as the Serving GPRS Support Node (SGSN) 203 or the Radio Network Controller (RNC) 230A, 230B in other embodiments.

In yet another example, the signaling proxy 225 may be attached to the base stations themselves in the case of an access network including base-station routers that are characterized by a flat architecture.

As discussed in co-pending and related patent application Ser. No. 11/674,858 to Balachandran et al., when establishing, tearing down and during a media session, the client 210 sends RTSP and/or RTCP messages intended for the media server 215 over the wireless network 200. According to example embodiments, the GGSN 220 intercepts the RTSP and RTCP messages from the client 210 and sends these messages to the signaling proxy 225 instead of the media server 215.

Figure 3:
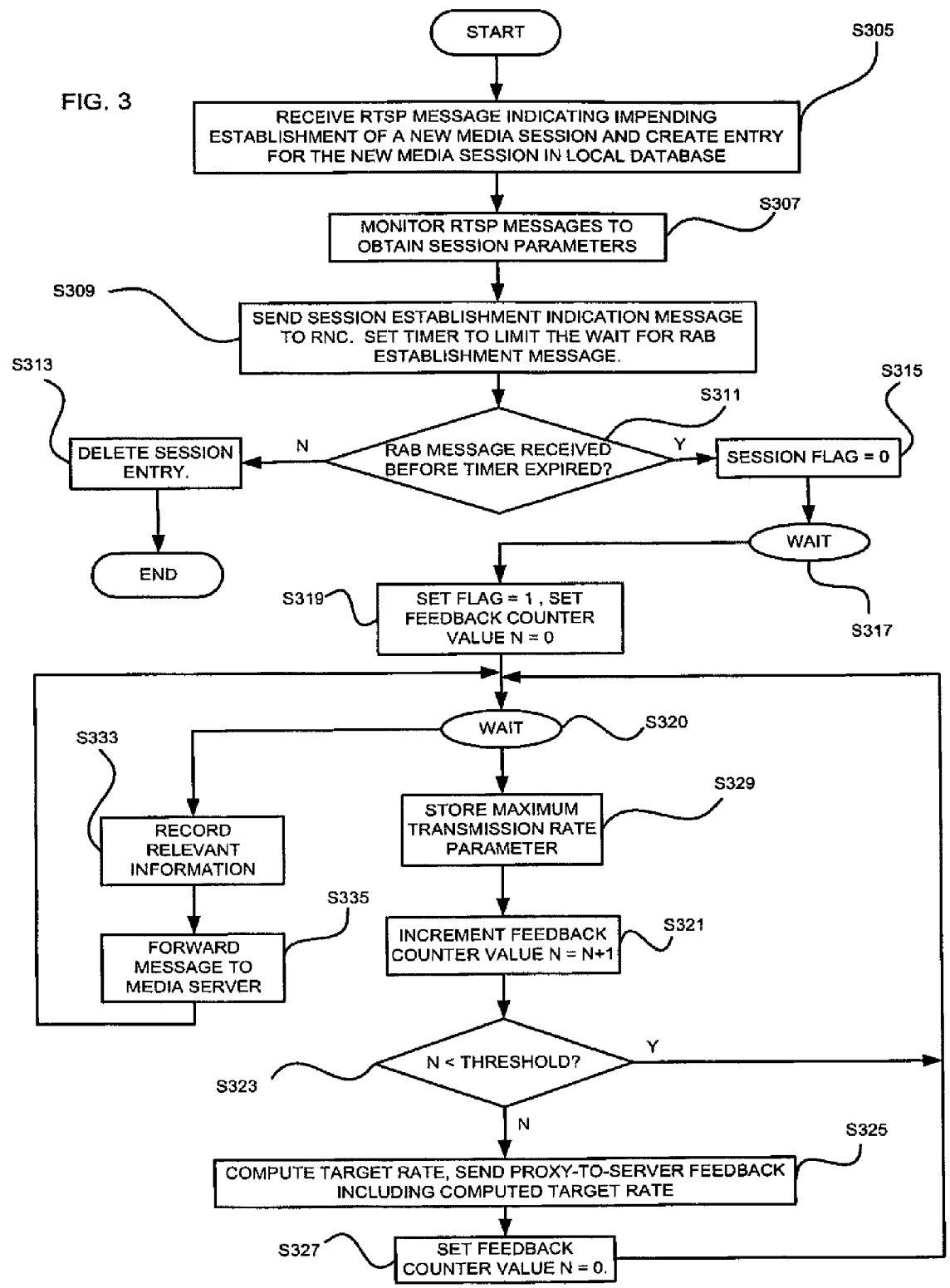
FIG. 3 illustrates an example embodiment of a method for providing feedback during a media session over a wireless network.

FIG. 3 illustrates an example embodiment of a method for establishing a target rate for a media session in a wireless network. The method in FIG. 3 is performed in response to receiving an initial RTSP message from the client 210 via the GGSN 220. The method of FIG. 3 will be discussed with regard to the network shown in FIG. 2, and in particular, as being performed at the signaling proxy 225.

Referring to FIGS. 2 and 3, at step S305 signaling proxy 225 creates an entry for the new media session in its local database (not shown) in response to an initial RTSP message from the client 210. The initial RTSP message indicates impending establishment of a new media session.

At step S307, the signaling proxy 225 monitors subsequent RTSP messages exchanged between the client 210 and the media server 215 during the media session's capability negotiation phase to obtain session parameters from the RTSP messages (e.g., client buffer size, time interval at which a receiver report is sent, etc.).

When the signaling proxy 225 learns that a media session is about to be established (e.g., via a "SETUP" RTSP message from the client), the signaling proxy 225 sends a session establishment indication message to the RNC 230A (at step S309) through which the corresponding media stream is to be delivered.

Also at step S309, the signaling proxy 225 sets a timer designating a time period during which the signaling proxy 225 waits for an RAB establishment message from the RNC 230A. Upon expiration of the timer, if the signaling proxy 225 has not received an RAB establishment message from the RNC 230A (at step S311), the signaling proxy 225 deletes the session entry from its local database (at step S313) and the process terminates.

Returning to step S311, if the signaling proxy 225 receives an RAB establishment message for the impending media session before the timer expires, the signaling proxy 225 turns off the timer and sets a session flag to 0 at step S315. The signaling proxy 225 then enters a wait state at step S317. During the wait state, the signaling proxy 225 waits for channel/network condition feedback messages from the RNC 230A and receiver report (or RTCP) messages from the client 210. As discussed herein, the channel/network condition feedback messages are also referred to as network condition feedback messages. Channel/network condition feedback messages include a maximum transmission rate parameter $W_S$, and, optionally, other relevant performance metrics such as the number of IP packets belonging to the media session that are waiting in a buffer at the RNC 230A, the corresponding byte count, and the like.

The maximum transmission rate parameter $W_S$ may be computed based on the number of IP packets delivered to the client 210 during the preceding channel condition feedback interval (of length $T_P$ seconds), the number of transmission opportunities available to the media session and the number of transmission opportunities actually used to carry data during the preceding interval. With a dedicated channel, a transmission block belonging to the dedicated channel represents a transmission opportunity.

In a more detailed example, the maximum transmission rate parameter $W_S$ for the $n^{th}$ interval of duration $T_P$ seconds, may be set equal to the available bandwidth parameter $W_A(n)$, which is given by (in units of bytes per second):

$$W_A(n) = M_D(n) * K_A(n) / (K_U(n) * T_P).$$

In the above equation, $K_A(n)$ and $K_U(n)$ respectively denote the number of transmission opportunities available to the media session and the number of transmission opportunities actually used to carry data during the during the $n^{th}$ channel condition feedback interval (of length $T_P$ seconds). Variable $M_D(n)$ denotes the byte count associated with the packets actually delivered to the client 210 during this interval. The maximum transmission rate parameter for the $n^{th}$ channel/network condition feedback interval $W_S(n)$ may be set equal to the available bandwidth parameter $W_A(n)$, or may be set according to the following heuristic:

$$W_S(n) = \alpha_L * W_A(n) \text{ if } Q(n) < \beta_L,$$
$$= \alpha_H * W_A(n) \text{ if } Q(n) > \beta_H,$$
$$= W_A(n) \text{ otherwise.}$$

In the above heuristic, $Q(n)$ is the amount of data belonging to the media session that is queued up in the RNC 230A buffer at the end of the $n^{th}$ channel/network condition feedback interval. $\beta_H$ is some "high watermark," and $\beta_L$ is some "low watermark," with $\beta_H > \beta_L$. Constants $\alpha_L$ and $\alpha_H$ are constants with $\alpha_H < 1$ and $\alpha_L > 1$.

In one example, with a 20-Kbyte per-session dedicated RNC 230A buffer, $\beta_H$ and $\beta_L$ may be set equal to 10 Kbytes and 2 Kbytes, respectively, whereas $\alpha_H$ and $\alpha_L$ might be set equal to 0.5 and 1.5 respectively.

The signaling proxy 225 expects to receive a channel/network condition feedback message from the RNC 230A every $T_P$ seconds and a receiver report message from the client device 210 every $T_R$ seconds.

Upon receiving an initial receiver report message from the client 210 during the wait state at step S317, the signaling proxy 225 sets the aforementioned session flag to 1 and initializes a channel/network condition feedback counter value N (referred to hereafter as a "feedback counter value") to 0 at step S319. At the signaling proxy 225, the channel/network condition feedback messages are ignored as long as the session flag equals 0. After the first receiver report message is received and the session flag is set to 1, the signaling proxy 225 enters a wait state at step S320. While in the wait state at step S320, the signaling proxy 225 records relevant information from any received receiver report messages at step S333 and forwards the receiver report messages to the media server 215 at step S335.

Returning to step S320, when the signaling proxy 225 receives a channel/network condition feedback message while in the wait state at step S320, the signaling proxy 225 stores the maximum transmission rate parameter reported in the message at step S329, and increments the feedback counter value N by 1 (N←N+1) at step S321. The signaling proxy 225 then compares the incremented feedback counter value N with a feedback counter threshold value THRESHOLD at step S323. The feedback counter threshold value THRESHOLD may be set at a value such as 5 so that the signaling proxy 225 provides rate feedback to the media server 215 at a reasonable interval.

For example, as noted above, the signaling proxy 225 receives channel/network condition feedback messages from the RNC 230A relatively frequently (e.g., once every 100 ms). In order to send proxy-to-server messages (discussed in more detail below) to the media server 215 at a reasonable interval (e.g., about 500 ms or about 1 second), the signaling proxy 225 generates rate feedback for the media server 215 once for every $5^{th}$ or $10^{th}$ received channel/network condition feedback message. Setting the threshold value THRESHOLD to 5 or 10 results in the signaling proxy generating rate feedback for the media server every 500 ms or every 1 second if the channel/network condition feedback interval is 100 ms.

Still referring to FIG. 3, if the feedback counter value N is less than the feedback counter threshold value THRESHOLD, the signaling proxy 225 returns to the wait state at step S320.

Returning to step S323, if the feedback counter value N is greater than or equal to the feedback counter threshold value THRESHOLD, the signaling proxy 225 computes a target rate $R_T$ based on values of the maximum transmission rate parameter $W_S$ associated with the media session stored at the signaling proxy 225 since the last time the feedback counter value N was reset. The signaling proxy 225 computes the target rate $R_T$ by calculating a weighted sum of the stored maximum transmission rate parameters $W_S$. The weighted sum may be a simple average, or the weights may be set so as to give greater importance to more recently received maximum transmission rate parameter values $W_S$. It is also possible to set the target rate $R_T$ at a value greater than the average of the maximum transmission rate parameter values $W_S$ to allow more aggressive streaming.

Still referring to step S325 in FIG. 3, the signaling proxy 225 sends the computed target rate $R_T$ (also referred to as a maximum streaming rate) to the media server 215 in a proxy-to-server feedback message.

As will be discussed in more detail below, the target rate $R_T$ is used at the media server 215 to set the content rate for the media session. During a media session, media (e.g., voice, video, audio, etc.) may be played out at different rates, referred to as content rates. The content rate corresponds to the average transmission rate needed to carry a corresponding media stream. A given content rate for a media stream can be realized by a combination of appropriate encoding and thinning. Typically, the higher the content rate, the better the media quality for the end-user.

Referring back to FIG. 3, at step S327 the signaling proxy 225 resets the feedback counter value N=0, clears all the stored maximum transmission rate parameter values $W_S$ and returns to the wait state at step S320. The method then continues as discussed above until the media session is terminated by appropriate RTSP messages from the client 210 or the media server 215.

According to example embodiments, when the media session is terminated with appropriate RTSP messages from the client 210 or the media server 215, the signaling proxy 225 deletes the entry for that media session from its local database. The signaling proxy 225 also stops sending proxy-to-server feedback messages to the media server 215 and instructs the RNC 230A to stop sending channel/network condition feedback messages.

As discussed above, the signaling proxy 225 sends proxy-to-server feedback messages to the media server 215 periodically (at regular intervals). The intervals of periodicity may be on the order of hundreds of milliseconds (e.g., about 100 ms to about 1000 ms or 1 second). In response to at least some of these messages, the media server 215 may set the content rate for a media session. The media server 215 also receives periodic receiver report messages from the client 210 via the signaling proxy 225.

Typically, from the viewpoint of the media server 215, the method for content rate selection according to example embodiments begins upon receipt of an initial RTSP message from the client 210 (forwarded from the signaling proxy 225). The RTSP message informs the media server 215 of the client 210's desire to set up a media session. The media server 215 then participates in the ensuing messaging for capability negotiation (exchange) and session establishment. The manner in which the capability negotiation and session establishment are performed is well-known in the art, and thus, a detailed discussion will be omitted.

As discussed above, in the case where the media is being streamed from a storage device, the media can be encoded at different content rates and stored for future use. For a live streaming media session, the encoding may be done "on the fly." When the media is being streamed, the media server 215 selects the appropriate files containing media frames, packetizes these files, and transmits them toward the client 210 based on the selected content rate. For the sake of this discussion, it is assumed that the media can be played out at any one of M content rates: $C_1, C_2, \ldots, C_M$, such that $C_1 < C_2 < \ldots < C_M$.

After completion of, or concurrently with, the capability negotiation and session establishment, the media server 215 determines a content rate for the media session and begins streaming media frames to the client 210. The media server 215 also begins receiving the above-discussed receiver report messages from the client 210 via the signaling proxy 225 and proxy-to-server messages from the signaling proxy 225. As is the case in conventional media servers, the media server 215 maintains estimates of frame playout times at the client 210. These estimates are updated whenever the media server 215 receives receiver report messages from the client 210. The media server 215 dynamically sets the content rate and performs frame transmission scheduling for the media session.

Figure 4:
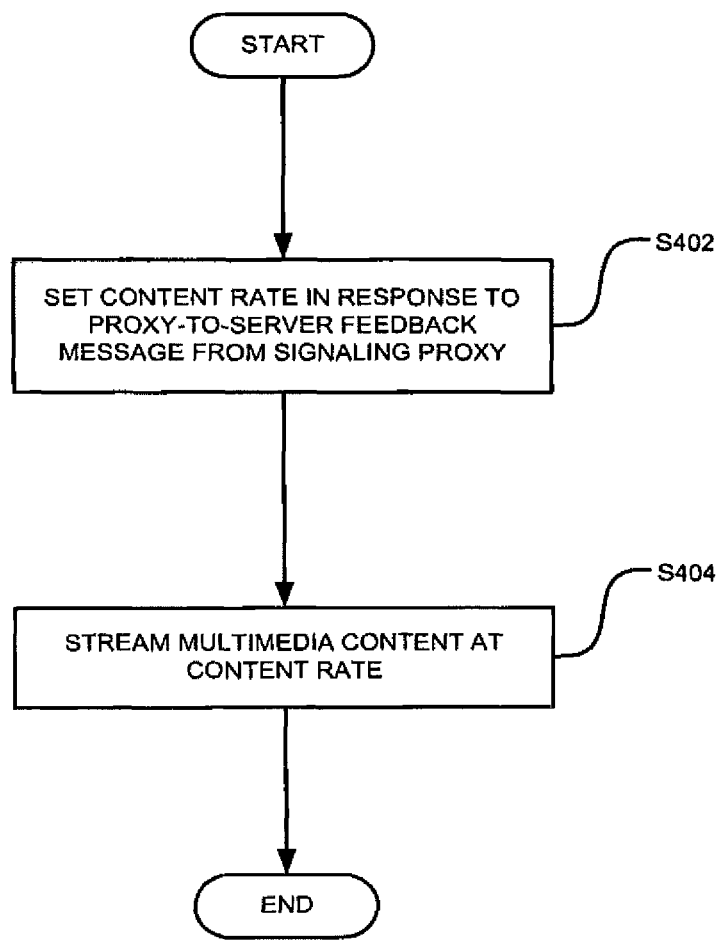
FIG. 4 illustrates an example embodiment of a method for setting content rate for a media session over a wireless network.

FIG. 4 illustrates an example embodiment of a method for setting content rate for a media session at the media server 215. The method shown in FIG. 4 may be used to set an initial content rate for a media session or to dynamically adjust (reset) the content rate during a media session.

Referring to FIG. 4, at step S402 the media server 215 sets the content rate for the media session in response to a proxy-to-server feedback message received from the signaling proxy 225. As discussed above, the proxy-to-server feedback message includes a target rate $R_T$. The target rate $R_T$ is indicative of current channel conditions in the network. In more detail, as discussed above, target rate $R_T$ is derived from a plurality of maximum transmission rate parameters $W_S$ from the RNC 230A, which are indicative of current channel conditions in the network.

In one example, the media server 215 sets the content rate by selecting the highest content rate (from among the M supported content rates: $C_1, C_2, \ldots, C_M$) that is less than or equal to $(1+\beta)*R_T$. As discussed herein, $(1+\beta)*R_T$ is referred to as a target rate parameter. In this example, parameter $\beta$ is a pre-determined or given content rate "aggression" factor, which is chosen to be greater than or equal to $\beta$. In one example, the parameter $\beta$ may be set between 0.05 and 0.10 to strike a balance between media quality and potential buffer overflows. In selecting the highest content rate, the media server 215 may also account for the protocol and packetization overheads.

Still referring to step S402, if the media server 215 determines that the lowest content rate available to the media server 215 (e.g., $C_1$) is still greater than $(1+\beta)*R_T$, the media server 215 sets the content rate equal to the lowest content rate $C_1$ at step S402 in FIG. 4.

In another embodiment, if there are M different content rates: $C_1, C_2, \ldots, C_M$, such that $C_1 < C_2 < \ldots < C_M$ and the current content rate is $C_i$ (where $i=1, 2, \ldots, M$), the media server 215 sets the content rate equal to content rate $C_j$, where j is the highest index for which $C_j < (1+\beta)*R_T$ among all indices in the set $(i-k, i-k+1, \ldots, i, \ldots, i+k-1, i+k)$.

If none of the content rates associated with indices in the set $(i-k, i-k+1, \ldots, i, \ldots, i+k-1, i+k)$ is less than or equal to $(1+)*R_T$, the content rate is set equal to $\max(i-k, 1)$, where k is a positive integer which constrains the number of steps taken up or down in content rate at any rate change instant and $\max(i-k, 1)$ refers to the larger of the two quatities "i–k" and "1." In the special case where k=1, the content rate may increase or decrease by one step at any rate change instant.

Still referring to FIG. 4, at step S404 the media server 215 begins streaming media frames to the client 210 at the set content rate.

Because frequent content rate changes may have an undesirable perceptual quality to the end-user at the client 210, the frequency of content rate change may be kept within a certain limit.

In one example, if the time interval at which the proxy-to-server feedback messages are sent from the signaling proxy 225 to the media server 215 is suitably large (e.g., 2-3 seconds), the media server 215 may adaptively/dynamically adjust the content rate in response to each proxy-to-server feedback message from the signaling proxy 225.

Figure 5:
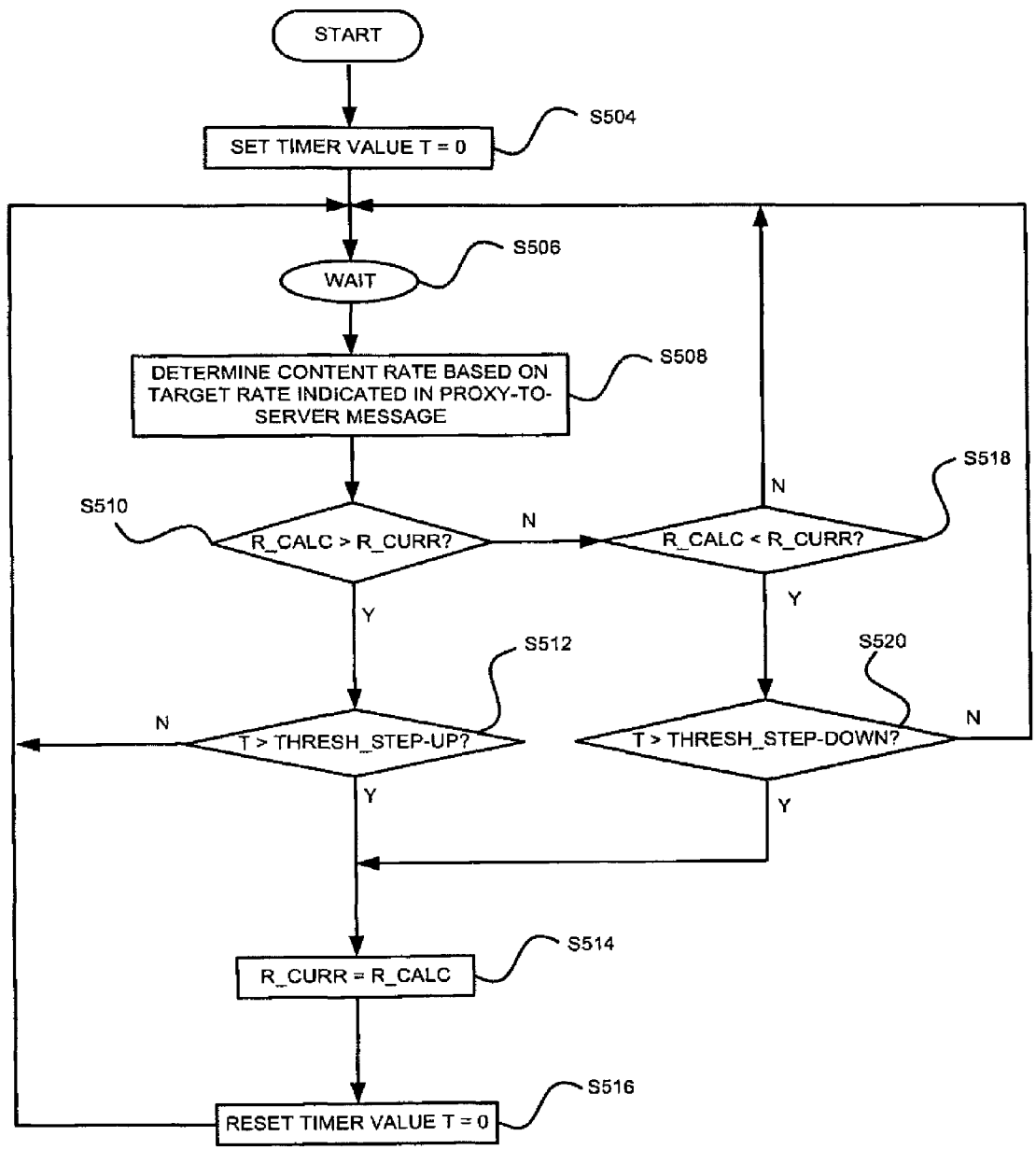
FIG. 5 illustrates a method for determining whether to set the content rate for a media session over a wireless network.

In another example, if the interval at which the media server 215 receives the proxy-to-server messages is relatively short (e.g., 400-500 ms), the media server 215 may employ the method shown in FIG. 5 each time a proxy-to-server feedback message is received to determine whether to adjust the content rate for the media session.

Referring to FIG. 5, after setting (resetting/updating/changing) the content rate, the media server 215 sets a timer value T=0 at step S504. The media sever 215 then waits for a proxy-to-server feedback message from the signaling proxy 225 at step S506. Upon receipt of a proxy-to-server feedback message, the media server 215 generates a new content rate R_CALC at step S508. The media server 215 selects the new content rate R_CALC based on the target rate $R_T$ received in the most recent proxy-to-server feedback message from the signaling proxy 225 as described above.

At step S510, the new content rate R_CALC is compared to the current content rate R_CURR for the media session. If the new content rate R_CALC is greater than the current content rate R_CURR, the media server 215 compares the timer value T with a Step-Up Threshold THRESH_STEP_UP at step S512. If the timer value T exceeds the threshold THRESH_STEP_UP, the media server 215 sets the current content rate R_CURR equal to the new content rate R_CALC at step S514. The media server 215 then resets the timer value T=0 at step S516, and returns to the wait state at step S506.

Returning to step S512, if the timer value T is less than or equal to the threshold THRESH_STEP_UP, the media server 215 returns to the wait state at step S506 without changing (while maintaining) the current content rate R_CURR.

Returning to step S510, if the new content rate R_CALC is not greater than the current content rate R_CURR, the media server 215 determines if the new content rate R_CALC is less than the current content rate R_CURR at step S518. If the new content rate R_CALC is not less than the current content rate R_CURR (the current content rate R_CURR and the new content rate R_CALC are equal), the media server 215 simply returns to the wait state at step S506 without changing the current content rate R_CURR or resetting the timer value T.

Returning to step S518, if the new content rate R_CALC is less than the current content rate R_CURR, the media server 215 compares the timer value T with a Step-Down Threshold THRESH_STEP_DOWN at step S520. If the timer value T is greater than the Step-Down Threshold THRESH_STEP_DOWN, the media server 215 sets the current content rate R_CURR equal to the new content rate R_CALC at step S514 and proceeds as discussed above.

Returning to step S520, if the timer value T is less than or equal to the Step-Down Threshold THRESH_STEP_DOWN, the media server 215 simply returns to the wait state at step S506 without changing the current content rate R_CURR.

This arrangement in which increases and decreases in content rate are controlled via two thresholds provides greater flexibility in striking a suitable tradeoff between the need to avoid frequent rate changes and the need to quickly reduce the payload when the channel conditions are such that a higher content rate cannot be sustained.

It is also possible to implement a similar arrangement in the signaling proxy 225 where instead of sending proxy-to-server feedback messages at fixed intervals, the signaling proxy 225 may send the messages at a shorter interval if the latest value of the calculated target rate $R_T$ is lower than the previous (most recent) value.

At the media server 215, frame transmission scheduling ensures that the client device 210 has the appropriate frames ready for decoding and play-out before their respective play-out times. Buffer space at the client 210 allows the media server 215 to transmit frames well ahead of their play-out times so that the frames are buffered at the client 210 and ready when needed. As noted above, the buffer space helps the client 210 overcome fluctuations in channel bandwidth available to the media session.

In the normal course of operation, the media server 215 outputs a frame once every frame period. The content rate associated with the frame is the current content rate R_CURR set by the media server 215. In some implementations, the media server 215 may output a block of K frames once every K frame periods to reduce the media server's input-output overheads. Regardless of whether the media server 215 outputs 1 frame every frame period or K frames every K frame periods, its output averages 1 frame per frame period. In some cases, the frequency of frame transmission may be adjusted. For example, if the client 210 indicates that its buffer space is getting full (via a receiver report message), the media server 215 may reduce the rate of transmission of new frames until the client indicates sufficient buffer space is available (via another receiver report message). For example, instead of transmitting at the normal rate of one frame every frame period, the media server 215 may transmit one frame every two frame periods until the client 210 indicates that it has sufficient buffer space for new frames.

On the other hand, the media server 215 may increase the rate of frame transmission at the beginning of the media session in order to reduce the initial wait when the buffer at the client 210 needs to be filled up to the pre-roll level before beginning play-out of frames. A method for adjusting frame transmission according to an example embodiment will be described in more detail below with regard to FIG. 6.

Figure 6:
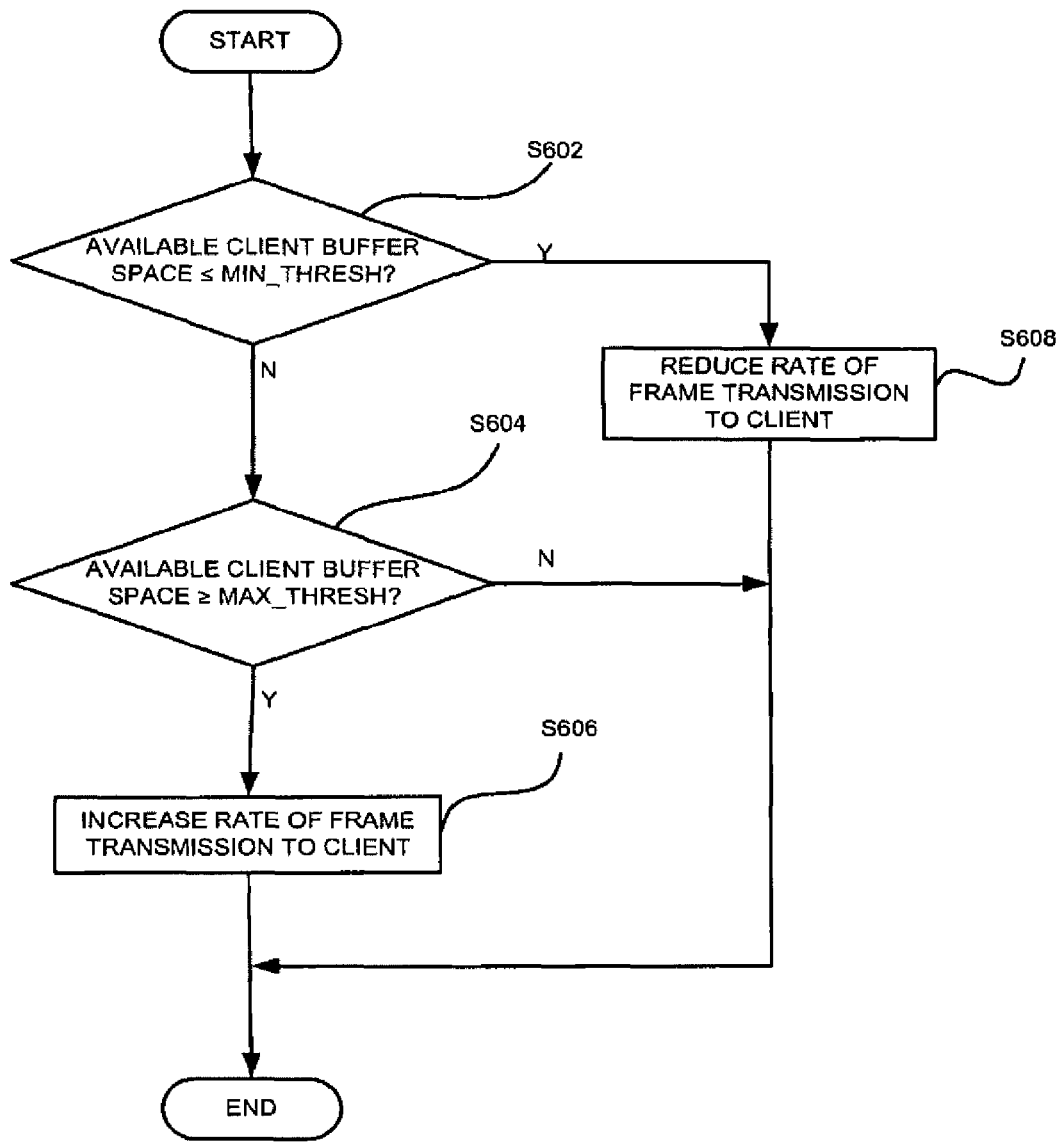
FIG. 6 illustrates a method for dynamically adjusting frame transmission scheduling according to an example embodiment.

FIG. 6 illustrates a method for dynamically adjusting frame transmission at the media server 215.

Referring to FIG. 6, upon receipt of a receiver report message from the client 210, the media server 215 compares the current available client buffer space with a minimum threshold value MIN_THRESH at step S602. If the media server 215 determines that the current available buffer space at the client 210 is less than or equal to the minimum threshold MIN_THRESH, the media server 215, at step S608, reduces the rate at which frames are actually transmitted to the client 210.

Returning to step S602, if the media server 215 determines that the current available buffer space at the client 210 is greater than the minimum threshold MIN_THRESH, the media server 215 compares the current available buffer space with a maximum threshold MAX_THRESH at step S604. If the current available buffer space at the client 210 is greater than or equal to the maximum threshold MAX_THRESH, the media server 215, at step S606, increases the rate at which frames are actually transmitted to the client 210.

Returning to step S608, if the current available buffer space at the client 210 is less than the maximum threshold MAX_THRESH, the media server 215 transmits frames to the client 210 at, for example, an average rate of one frame per frame period.

Embodiments of the techniques described herein may provide a number of advantages over the conventional art. For example, in conventional media service (e.g., video service) setups, a media server estimates the content rate for the media session using the data provided by the client. This estimation, being indirect, often contains significant errors or may simply be obsolete, especially in dynamic operating conditions such as those typical of wireless networks.

By contrast, example embodiments utilize a content rate based on a target rate determined by the signaling proxy, which is more accurate at least in part because it is based on direct measurements. This improves the accuracy of the content rate determination, which allows the server to transmit data optimally, while reducing the likelihood of packet losses in the wireless access network or of underutilizing available resources.

The invention being thus described, it will be obvious that the same may be varied in many ways. Such variations are not to be regarded as a departure from the invention, and all such modifications are intended to be included within the scope of the invention.

We claim:

1. A method for dynamically setting a content rate of a media session for a wireless client in a wireless network, the method comprising:
   receiving, by a signaling proxy server, a first message associated with the wireless client and originating from a network node of a wireless access network, the first message including content rate information, the first message being redirected by a network element associated with a content transmission path of the media session to the signaling proxy server outside of the transmission path;
   storing, at the signaling proxy server in response to the first message, one or more maximum transmission rate parameters;
   generating, by the signaling proxy server, a target rate for the media session based on the stored maximum transmission rate parameters; and
   transmitting, by the signaling proxy server, the first message and a second message including the target rate to a media server to dynamically set the content rate for the media session.

2. The method of claim 1, further comprising:
   receiving, at the signaling proxy server, a first receiver report message from the wireless client; and
   initializing a feedback counter value in response to the received first receiver report message.

3. The method of claim 2, further comprising:
   receiving a maximum transmission rate parameter from a network controller;
   storing the maximum transmission rate parameter as one of the one or more maximum transmission rate parameters;
   incrementing the feedback counter value; and
   comparing the incremented feedback counter value to a counter threshold.

4. The method of claim 3, wherein the generating step generates the target rate for the media session based on the stored one or more maximum transmission rate parameters if the counter value is greater than or equal to the counter threshold.

5. The method of claim 1, further comprising:
   forwarding the receiver report message to the media server.

6. The method of claim 5, further comprising:
resetting the feedback counter value; and
deleting the stored one or more maximum transmission rate parameters.

7. The method of claim 5, further comprising:
recording, at the signaling proxy server prior to the forwarding step, at least a portion of the receiver report message from the client.

8. The method of claim 1, wherein the target rate is an average of the one or more stored maximum transmission rate parameters from the network controller.

9. The method of claim 8, wherein the target rate is a weighted average of the one or more stored maximum transmission rate parameters from the network controller.

10. A method for dynamically setting a content rate of a media session for a wireless client in a wireless network, the method comprising:
receiving, by a media server from a signaling proxy server, a first proxy-to-server feedback message generated by the signaling proxy server and one or more receiver report messages associated with the wireless client and originating from a network node of a wireless access network, the one or more receiver report messages including content rate information, the signaling proxy server being outside a content transmission path associated with the media session;
determining whether or not the first proxy-to-server feedback message includes a first target rate for the media session;
if the first proxy-to-server feedback message includes the first target rate,
discarding the content rate information within the one or more receiver report messages, and
selecting, at the media server, a content rate from among a plurality of supported content rates in response to the first proxy-to-server feedback message, the selected content rate being less than or equal to a first target rate parameter derived from a first target rate included in the first proxy-to-server feedback message; and
streaming multimedia frames from the media server to the wireless client at the selected content rate.

11. The method of claim 10, further comprising:
calculating the first target rate parameter based on the first target rate and an aggression factor.

12. The method of claim 11, wherein the first target rate parameter is calculated according to the following equation:

$(1+\beta)*R_T$; wherein $R_T$ is the first target rate and $\beta$ is the aggression factor.

13. The method of claim 10, further comprising:
receiving a second proxy-to-server feedback message from the signaling proxy server;
determining whether to update the content rate for the media session based on a second target rate included in the second proxy-to-server feedback message and a counter value; and
selectively updating the content rate for the media session based on the determining step.

14. The method of claim 13, wherein the determining step further comprises:
generating a second target rate parameter based on the second target rate;
identifying an updated content rate based on the second target rate parameter; and wherein
the selectively updating step updates the content rate for the media session if the updated content rate is different from the selected content rate and the counter value is greater than the first threshold value.

15. The method of claim 14, wherein the selectively updating step further comprises:
setting the content rate for the media session equal to the updated content rate if the updated content rate is different from the selected content rate and the counter value is greater than the first threshold value.

16. The method of claim 10, further comprising:
comparing, at the media server, a buffer space parameter value with a first threshold, the buffer space parameter value being included in a receiver report message from the wireless client and being indicative of an amount of available buffer space at the wireless client; and
adjusting a rate of multimedia frame transmission to the wireless client based on the comparing step.

17. The method of claim 16, wherein the first threshold value is a minimum threshold value, the adjusting step further comprising:
reducing the rate of multimedia frame transmission to the wireless client if the buffer space parameter value is less than the minimum threshold value.

18. The method of claim 16, wherein the first threshold value is a maximum threshold value, the adjusting step further comprising:
increasing the rate of multimedia frame transmission to the wireless client if the buffer space parameter value is greater than the maximum threshold value.

19. A method for dynamically setting a content rate of a multimedia session for a wireless client in a wireless network, the method comprising:
receiving, by a signaling proxy server, a first message from the wireless client, the first message being redirected by a network element associated with a content transmission path of the media session to the signaling proxy server outside of the transmission path;
storing, at the signaling proxy server in response to the first message, one or more maximum transmission rate parameters;
generating, by the signaling proxy server, a target rate for the media session based on the stored maximum transmission rate parameters; and
transmitting, by the signaling proxy server, the first message and a proxy-to-server feedback message including the target rate to a media server in a proxy-to-server feedback message;
receiving, by the media server from the signaling proxy server, the proxy-to-server feedback message generated by the signaling proxy server and one or more receiver report messages associated with the wireless client and originating from a network node of a wireless access network, the one or more receiver report messages including content rate information, the signaling proxy server being outside a content transmission path associated with the media session;
determining whether or not the proxy-to-server feedback message includes a target rate for the media session;
if the feedback message includes a target rate for the media session,
discarding the content rate information within the one or more receiver report messages,
selecting, at the media server, the content rate from among a plurality of supported content rates in response to the proxy-to-server feedback message, the selected content rate being less than or equal to a target rate parameter derived from the target rate included in the proxy-to-server feedback message; and streaming multimedia frames from the media server to the wireless client at the selected content rate.

* * * * *